Aug. 19, 1969      M. A. McCOY      3,462,633

ENERGY BURST GENERATING ELEMENT

Filed Jan. 3, 1967      2 Sheets-Sheet 1

MARCUS A. McCOY
INVENTOR.

BY A. M. Shapiro
ATTORNEY

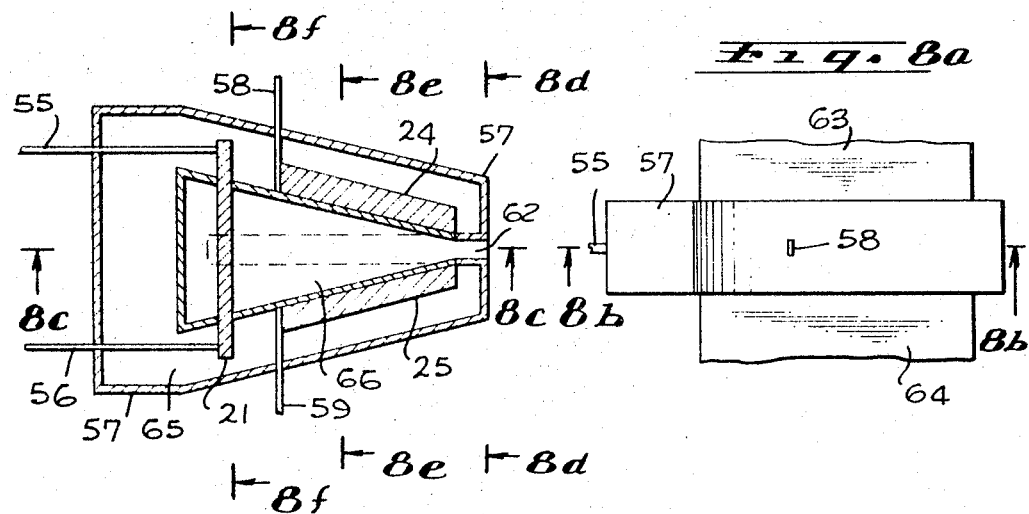
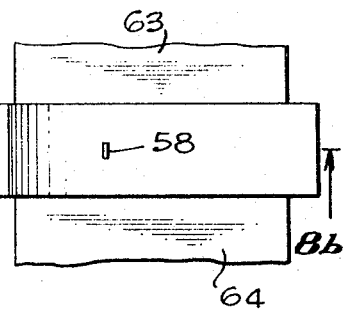
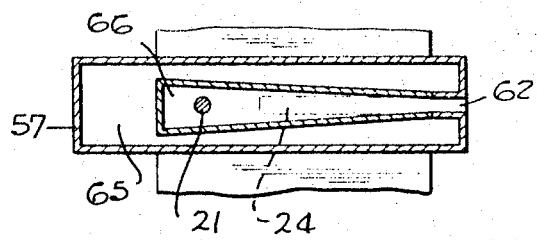
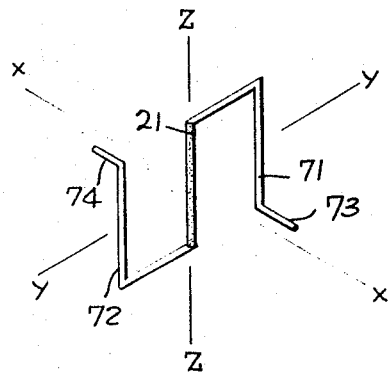
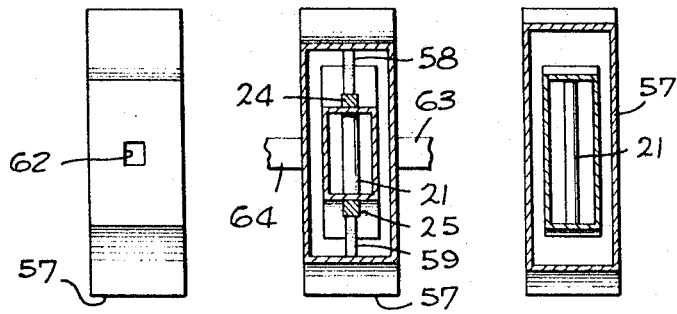

United States Patent Office 3,462,633
Patented Aug. 19, 1969

3,462,633
ENERGY BURST GENERATING ELEMENT
Marcus A. McCoy, Los Angeles, Calif.
(19229 Keswick St., Reseda, Calif. 91335)
Filed Jan. 3, 1967, Ser. No. 606,623
Int. Cl. H01j 1/50, 23/10
U.S. Cl. 313—156                            8 Claims

ABSTRACT OF THE DISCLOSURE

An energy burst generating element is disclosed which comprises a carbon element mounted with its ends attached to low resistance contacts. When subjected to a sufficiently high voltage pulse, the element emits a burst of light, acoustic and electromagnetic energy. The element is reusable.

Background and summary of the invention

This invention has for its principal object to provide a source of acoustic or mechanical energy electrical plasma, and/or electromagnetic energy which offers specific advantages, to be defined, over contemporary exploding wire practices. In prior art exploding wire devices such as, for example, squibs and flash bulbs, energy bursts are produced by exploding an electrical conductor by the sudden application of excessive electrical currents. A major disadvantage of such devices is the fact that the exploding wire is destroyed by the explosion and hence is not reusable after one firing. This invention provides all the phenomena attendant to such an explosion while providing an element which is not itself destroyed upon firing. The inventive energy burst generating element therefore is reusable for an indefinite number of firings.

Acoustic or mechanical energy, electrical plasma, or electromagnetic radiation produced by electrical discharge presently is employed for a wide range of purposes. These include the production of experimental sonar pulses, high velocity shock waves, high temperature plasmas and brilliant short time light sources for photographing rapidly moving objects. Electrical discharge may also be employed to initiate secondary reactions in associated bodies, for example, to excite an inert gas to breakdown potential after which it will conduct large electrical currents with low voltage drop, to explode a gas or other explosive, or to stimulate emission in certain types of laser systems.

Materials presently employed for such electrical discharge purposes include so called semi-conductors employing avalanche effects which are well known in the transistor industry and both inert and explosive gases.

Devices employing inert gas or vapors which are capable of switching high power or of producing high intensity monochromatic and near white light are limited in minimum values of rise time, time of duration, and full time of the pulse of energy they produce. Such devices are normally bottled in clumsy, heavy, and fragile containers in order to preserve autonomy of the gas. In addition, tubes typically employed for generating light by electrical discharge require trigger potentials many times in excess of the voltage at which they will function after being triggered.

Exploding wires offer the capability of steeper rise and fall times, and shorter energy pulse durations than gas devices. They can handle power far in excess of both inert gas tubes and semi-conductor avalanche devices in contemporary practice. Exploding wires are capable of producing very high power and high velocity acoustic shock waves and high temperature electrical plasma.

Exploding wires are one-shot devices, however, and are not reusable after being once fired. This offers major disadvantages and completely forbids certain functions which cannot be performed by other means than the exploding wire but which must be repeatable functions. Efforts to handle exploding wires in replacement magazines like bullets for a gun result in considerable disadvantages such as limit to round number, expense of material and failures in handling and connecting structure.

This invention involves the discovery of physical phenomena unique to certain physical elements or compounds, such as carbon, under certain conditions and parameters whereby an element has the ability to appear to explode in a manner similar to the explosion of a metallic conductor when pulsed with electrical voltages exceeding a certain threshold value. The acoustic, electromagnetic and plasma emissions from an element in accordance with this invention, which is called an energy burst generating element herein, are similar to those of an exploding metallic conductor.

The principal advantage of this invention is that the device is not destroyed by the firing but remains reusable for an indefinite number of times. In addition, this invention has particular environmental advantages over the exploding wire inasmuch as the device will not be corroded by certain environments as rapidly as other conducting materials. Also, all particle emissions from the invention give evidence of being ion size, whereas larger than ion size fragments are emitted from ordinary exploding wires. In addition, the melting temperature of carbon exceeds that of most exploding wire materials; hence, the invention can be employed in the presence of higher pre-firing ambient temperatures. Specific environments in which this invention will be particularly applicable and will function well include in a vacuum, underwater, in normal atmosphere, and in the presenc of inert gases. Further, the invention incorporates features which allow geometric and temporal shaping of the energy produced.

In brief, the energy burst generating element comprises a rod or thin film carbon element which is firmly attached to two contact members. When a voltage pulse exceeding a threshold voltage (which for a typical embodiment may be in the range of 250 volts) is applied across the contact members, an intense burst of light, acoustic and electromagnetic energy is produced. The energy burst appears to result from the production of a plasma of carbon ions adjacent the element, and does not noticeably decrease the volume of the element as a result of firing. The element may be fired many times without significant deterioration.

It is thus an object of this invention to provide a reusable source of acoustic and electromagnetic energy bursts.

It is another object of this invention to provide a device capable of producing acoustic energy bursts for use in liquid or gaseous environments.

It is a further object of this invention to provide an energy burst generating element having explosion characteristics similar to an exploding wire, but which is reusable.

It is a further object of this invention to provide a carbon element usable as a source of high energy plasma.

It is yet another object of this invention to provide a plasma gun which is capable of producing multiple bursts of particles which may be used for welding, cleaning and the like.

Another object of this invention is to provide means for generating a cloud of high activity conductive plasma particles for obtaining a fast acting momentary high power switch.

Brief description of the drawings

The features of the present invention which are believed to be novel are set forth with particularity in the appended claims. The present invention, both as to its organization and manner of operation, together with further objects and advantages thereof, may best be understood by reference to the following description, taken in connection with the accompanying drawings which are utilized for illustrative purposes only, in which:

FIGURE 3 also shows the voltage generated across a photoelectric cell illuminated by the inventive energy burst generating element during a typical firing;

FIGURES 8a–8f illustrate another embodiment of the energy burst generating element, as included in a gun useful for concentrating and directing energy generated by the element, wherein FIGURE 8a is a fragmentary top plan view of the gun, FIGURE 8b is a side sectional view along line 8b—8b of FIGURE 8a, FIGURE 8c is a horizontally sectional view along the line 8c—8c of FIGURE 8b, FIGURE 8d is an elevational view of the front of the gun as seen at line 8d—8d in FIGURE 8b, FIGURE 8e is a sectional view, partly in elevation, as seen along the line 8e—8e of FIGURE 8b, and FIGURE 8f is a sectional view, partly in elevation, as seen along the line 8f—8f of FIGURE 8b; and FIGURE 9 is a fragmentary perspective view illustrating another embodiment of the inventive energy burst generating element including electromagnetic means for directing the plasma generated at time of firing.

Description of the preferred embodiments

Figure 1:
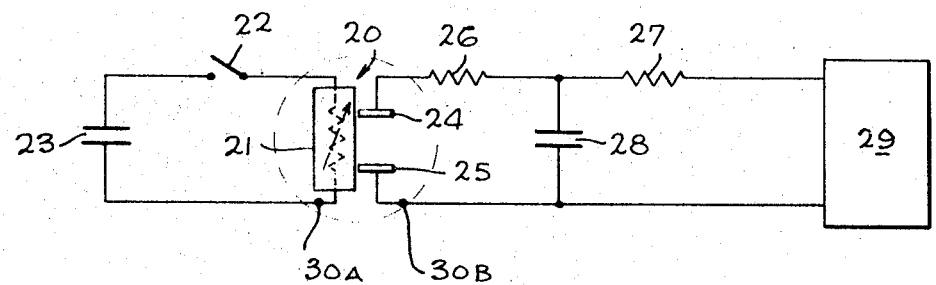
FIGURE 1 is a schematic diagram of a circuit for activating the inventive energy burst generating element and for demonstrating its switching characteristics.

This invention comprises an energy burst generating element and is readily demonstrable by employing a carbon rod element 21 in the circuit of FIGURE 1 designed for firing the device. To fire carbon element 21, the parent or emitter element is abruptly connected by means of a mechanical or electronic switch 22 across a previously charged capacitor 23. Alternately, the capacitor 23 may be replaced by a device such as a pulse or shaped function generator capable of providing short pulses of high voltage. Providing that capacitor 23 previously has been charged to a sufficiently high voltage, element 21 will emit a brilliant flash accompanied by an acoustic crack and an intense electromagnetic pulse and a rapidly dissipating cloud of high energy plasma particles.

Figure 2:
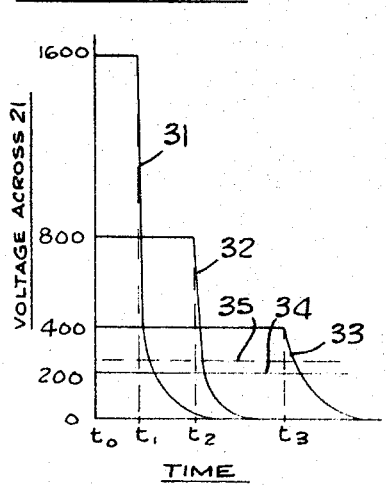
FIGURE 2 is a graph showing typical waveforms illustrating the voltage across the inventive energy burst generating element as a function of time, when activated by the circuit of FIGURE 1.

Should cathode ray oscilloscope be connected across element 21 (see FIGURE 1), typical waveforms, such as those shown in FIGURE 2 may be observed. In the graph of FIGURE 2, the vertical axis indicates the voltage appearing across element 21, and the horizontal axis represents time; switch 22 was closed at time $t_0$ in all cases. As shown in FIGURE 2, curve 31 was observed when a 1600 volt charge on capacitor 23 was employed, curve 32 when capacitor 23 was charged to 800 volts, curve 33 with a 400 volt charge and curve 34 with a 200 volt charge. It is notable that for the particular length, cross-sectional dimensions, and grade of carbon employed for element 21, a distinct change in curve shape appeared when the capacitor charge varied a few volts either side of 250 volts. This is called the plasma threshold level 35. Other distinct changes in observable phenomena occurred also at threshold level 35. Below the threshold there is no evidence of acoustic or electromagnetic shock wave emanating from element 21, nor is any luminescence evident near parent element 21. Moreover, the temperature of element 21 immediately after firing increases nearly linearly with voltage increase below threshold but above threshold 35 this temperature decreases only slightly as the voltage increases.

Within a range of a few volts above or below threshold level 35, some evidence of electrical plasma appears when element 21 is fired. In particular, erratic meteor-like excrescences fly off from parent element 21; these burn up in the atmosphere like true meteors. Also around threshold, mild cracks of acoustic shock may be heard.

If the voltage applied across element 21 is more than a few volts above threshold, the mild acoustic crack becomes a more distinct bang and the entire parent element 21 becomes encased in a brilliant plasma flare. An acoustic burst and emission of broadband electromagnetic energy also occurs when switch 22 is closed, with charge voltage above threshold level 35. As the charge voltage is increased above threshold, the brilliance of the plasma flare, the intensity of the acoustic shock and the intensity of RF noise received on a broadband radio receiver similarly increase. However, the temperature of parent element 21 after firing decreases with firing voltage increase. Also significant is the fact that the time duration during which the voltage across element 21 remains above threshold decreases approximately in direct proportion to the voltage above threshold. This time duration represents the time between application of current and birth of plasma or actual firing of element 21 (as indicated at $t_1$, $t_2$, or $t_3$ at typical curves 31, 32 and 33, respectively).

Note that the energy used to fire element 21 remains approximately constant regardless of the voltage to which capacitor 23 was charged. Thus a 1600 volt charge produces a waveform 31 (see FIGURE 2) of approximately twice the height of an 800 volt charge (see FIGURE 2, waveform 32) and an above threshold 35 width of approximately ½ the width of an 800 volt charge. Note also in FIGURE 2 that the above threshold firing waveforms 31, 32 and 33 each resemble a flat-topped pulse; this may be contrasted to the slow discharge of capacitor 23 when element 21 is pulsed with a voltage below threshold, as indicated, for example, by curve 34. The shape of the above threshold firing waveforms 31, 32 and 33 indicate that the value of resistance across the terminals of the parent element 21 has abruptly decreased at the times $t_1$, $t_2$ or $t_3$ in FIGURE 2 of actual firing.

Elements 24 through 29 of FIGURE 1 are not essential to basic emitter functions of the invention, however. Their application illustrates how energy burst generating element 21 may be incorporated into a switching deivce; such a switching device also gives credence to the theory (described hereinbelow) that a plasma is developed around element 21 at the time of firing. Referring again to FIGURE 1, components 24 and 25 each represent a collector or anode spaced close to the parent body and close to each other but not so close that any charge voltage existing on second capacitor 28 will break down the gap between anodes 24 and 25 and element 21 prior to firing of the emitter element 21. The dotted circle 20 indicates schematically the volume within which a plasma is developed when element 21 is fired. Resistor 26 represents an electrical load connected so that discharge current from capacitor 28 flowing through the loop including anodes 24 and 25 will produce a voltage drop across load 26. Item 27 is a rate-of-charge limiting resistor connecting capacitor 28 to voltage source 29 used to charge capacitor 28.

Figure 3:
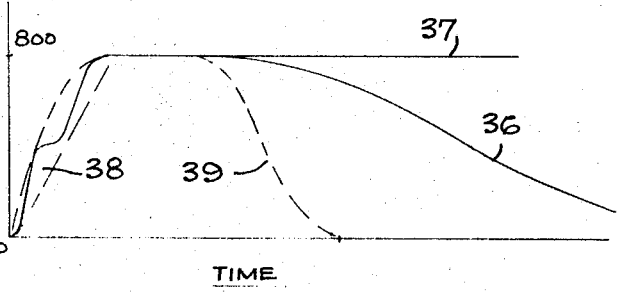
FIGURE 3 is a graph of waveforms which are representative of voltages switched by the energy burst generating element when used in a switching circuit such as that of FIGURE 1.

FIGURE 3 indicates waveforms observed across the switching electrodes 24 and 25 of FIGURE 1 with points 30A and 30B connected together and charge source 29 set for approximately 800 volts; capacitor 28 was approximately 25 microfarads. Waveform 36 approximates observations made with resistors 26 and 27 each approximately 10,000 ohms. Plasma lifetime is so short that under these conditions capacitor 28 loses very little charge. Waveform 37 was taken under conditions identical to waveform 36 except for resistor 26 being reduced to near zero ohms. This permitted checking resistance of plasma between emitter and collector by means of the discharge rate of capacitor 28.

Referring to the graph of FIGURE 3, it may be seen that the rise times of waveforms 36 and 37 were nearly identical within the region defined by the faired dash lines at 38 over a long series of repetitive firings at between 800 volts and 1600 volts. Thus, the region 38 indicates the time which the plasma generated by firing element 21 takes to close the gap between anodes 24 and 25. Note that this time is commensurate with the time variation between $t_1$ and $t_2$ of FIGURE 2. (FIGURES 2 and 3 being drawn to the same approximate scale. Results indicate that, for the voltages given, a spacing of .25 centimeter between element 21 and anodes 24 and 25, and a spacing of .5 centimeter between elements 24 and 25, the anode-to-anode resistane was less than .2 ohm during the rise time of the waveform.

For other test cases, the charge voltage source 29 was varied from 0 to 2400 volts. With a pre-firing level of zero volts on capacitor 28 and with resistor 26 near zero ohms and resistor 27 greater than 10,000 ohms, firing of the emitter from an 800 volt charge on capacitor 23 produced the appearance of a half sine waveform across capacitor 28. This wave beginning at zero went to approximately 800 volts negative, then to 800 volts positive and decreased to leave approximately 50 volts negative DC on capacitor 28. Polarities stated are for the junction of capacitor 28 and resistor 27 with respect to point 30B which was jointed to point 30A for the tests. These observations indicate the plasma created first a sine wave across capacitor 28 then left it with a small net DC charge.

With both resistors 26 and 27 of FIGURE 1 reduced to near zero, an arc created between elements 24 and 25 by firing the emitter 21 will be sustained as long as sufficient current is available from capacitor 28 and DC source 29.

Waveform 39 (shown by a dash line in FIGURE 3) indicates the approximate waveform of the light output received from a photoelectric cell oriented to detect the light emitted by energy burst generating element 21 when fired above threshold level. Note that the rise time of the light pulse coincides with the plasma generation, as indicated by curve portion 38 of FIGURE 3. The light cell itself adds considerable stretching to the waveform. The vertical scaling of FIGURE 3 is not properly calibrated for waveform 39.

Thus far, the inventive energy burst generating element 21 has only been described in general terms and was represented in FIGURE 1 by a symbol for a resistor only because a more adequate symbol was not available. Element 21 now will be described in detail, particularly with reference to FIGURES 4, 5, 6 and 7 which show various embodiments thereof.

The energy burst generating element 21 preferably comprises carbon and compounds with carbon content. The nature of contaminants present in the carbon has not been found to be important except that physical destruction may occur if such contaminants are either highly conductive or lessen structural strength. The term "carbon" includes all of its conductive forms, compositions and compounds including pencil graphite, nuclear quality, and arc electrode materials in all grades within the ranges of 1% pure carbon to essentially 100% pure carbon. Other useable materials include tungsten carbide, which has limited uses as described elsewhere in this application. Silicon in some form also is expected to produce similar but inferior results.

Figure 4:
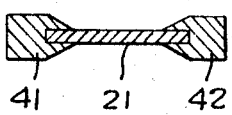
FIGURE 4 is a sectional view of a typical embodiment of the inventive energy burst generating element.

The energy burst generating element 21 may be fashioned from a bulk sample of carbon, or may comprise a thin film of carbon on a substrate of some other material, which may be an insulator. A cross-sectional view of one possible embodiment of energy burst generating element 21 is shown in FIGURE 4. FIGURE 4 may represent either the cross-section of a round rod-like element or the broad surface of a thin film; configurations other than round rods or thin films are believed to be less desirable because of surface wave problems involved in creating the plasma. A common pencil "lead" makes a quite adequate rod element 21 for demonstrating the present invention.

Thin films of carbon which produce the phenomena of this invention comprise two basic varieties, each disposed on insulating substrates which also may include connecting terminals for applying electrical current to the element. One type of thin film is deposited so heavily that the deposit forms an electrically continuous circuit of relatively low resistance which film type shows temperature-resistance characteristics resembling those of a carbon rod. A second type of thin film comprises micro-particles of carbon spaced so that they are not in direct electrical contact with one another. Between them lies the much higher electrical resistance of the gaps across the surface of the insulating substrate material. This gap resistance may achieve a value as high as hundreds of megohms. The firing voltage must be great enough to break down the gaps across the substrate material. Under the abrupt application of such a voltage, the arc across all gaps between the particles permits current to rapidly excite the particles to plasma state. Tests indicate plasma output of such a film is somewhat higher in relation to electrical input than is true for either the solid carbon or the continuous deposit film.

Referring again to FIGURE 4, the carbon element 21 is seized tightly by contacts 41 and 42 which may be made of a material having lower electrical resistance than carbon. Where the firing duty cycle is low, common aluminum, brass or copper perform well as contacts 41 and 42. For higher duty cycles, high temperature metals such as stainless steel have been employed. Common tapered, model-makers collets of low grade steel have served well for most tests performed. Tapered surfaces adjacent the junction of the carbon element 21 and the contacts 41 and 42 are preferred, since such surfaces permit radiated energy to clear the area of origin better than non-tapered surfaces, thus reducing heating and shock wave effects on carbon element 21.

It appears essential to the performance of this invention that initial firing of element 21 must begin at a point of contact resistance. Because even the best of clamping by end contacts such as 41 and 42 exhibited such resistance, this function has been easy to achieve. When this function has been suppressed by placing plastics or other suppression materials over end contact areas, the required threshold voltage increases considerably and the element 21 often is destroyed by a single firing. It is believed that without use of such suppression materials, contacts cannot be made tight enough to prevent proper firing. Note also that end mountings which move considerably in response to the shock or magnetic forces will cause emitter fracture.

Figure 5:
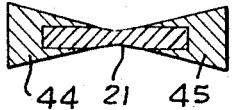
FIGURE 5 is a sectional view of another embodiment of the inventive energy burst generating element.

Another embodiment of the energy burst generating element 21 is shown in FIGURE 5; this embodiment includes a tapered element 21 connected to tapered metallic connectors 44 and 45. Upon receiving sufficient current to fire any area of element 21, the increment at the most narrow point (near the middle) will fire first. The firing will then progress in time outwardly toward the ends, decreasing in intensity as it progresses. This permits geometrical firing order to be timed according to the taper of element 21.

Because of the requirement for end fire initiation, the taper of element 21 illustrated in FIGURE 5 is dangerous to the emitter element, unles element 21 is broken at the thinner middle point and held tightly together there by mechanical pressure. Under such conditions, firing occurs at the carbon-to-carbon contact (at the break) before any flaring at end contacts can be observed. The end contact areas may be covered with suppression material under these conditions without danger to the element. Excessive resistance at the center break causes excessive localized erosion of carbon in this area, thus the embodiment of FIGURE 5 is considered less desirable than that of FIGURE 4.

Figure 6:
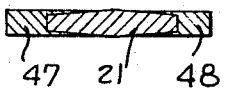
FIGURE 6 is a sectional view of still another embodiment of the inventive energy burst generating element.

Yet another embodiment of energy burst generating element 21 is illustrated in FIGURE 6; in this embodiment, element 21 comprises a carbon body or film having a larger cross-sectional dimension near its center than adjacent contacts 47 and 48. Such an element 21, when fired similarly to the manner described above, fires progressively and in decreasing intensity beginning at the ends and travelling toward the middle. Since firing begins at the ends, normal end contact rules apply. In the presence of excessive taper, two simultaneous localized firings near each end occur, but no structural damage to the emitter is observed. Various combinations of tapers for element 21 (such as those of FIGURES 5 and 6) may be employed to shape both total geometric patterns and total spectra of the radiated acoustic and electromagnetic energy by establishing appropriate time, phase and amplitude relationships between energy radiated at each cross-sectional portion of element 21. Shapes for element 21 also could be generated in three dimensions for creating special energy radiation geometry and spectra.

Figure 7:
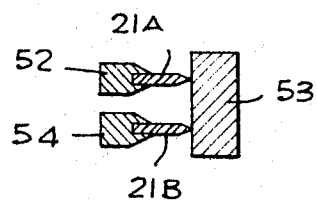
FIGURE 7 is a sectional view of another embodiment of the inventive energy burst generating element configured for point firing at more than one location.

Another possible embodiment of the invention which may employ two energy burst generating elements 21A and 21B, is shown in FIGURE 7. In this embodiment, emitter element 21A may be firmly embedded in end contact 52 and more loosely connected to contact 53. In more elementary forms, element 21B and contact 54 are not essential. A firing voltage applied across terminals 52 and 53 causes firing to be initiated at the point of contact between members 21A and 52. Under these conditions, element 21A functions normally in accordance with rules for tapered elements and its own taper. Upon the addition of an additional emitter element 21B and a firmly bonded end contact 54, application of firing current between members 52 and 54 results in simultaneous firing of elements 21A and 21B.

It is noted, however, that while members 21A and 21B of FIGURE 7 have been described as the emitter elements, member 53 may instead be made of carbon and thus comprise the energy burst generating element. In this case, members 21A and 21B may be ordinary high temperature metals. Under these conditions, emission is localized on the surface of emitter 53 around the points of contact with members 21A and 21B. Firing current supplied between 52 and 54 will cause dual firing at selected points on emitter 53. Alternately, two separate firing voltage sources, one between members 52 and 53, and one between members 54 and 53 (with member 53 as the common return point) may be applied to achieve time sequenced firing.

The embodiment of FIGURE 7 may be modified further to add additional members (not shown) similar to elements 21A and 21B. Such additional members and appropriate firing sources provide a multi-element system whose geometry is determined by the shape and position of the elements and whose firing sequence can be controlled by appropriately timing the application of the firing sources. The result is a system whose radiation patterns may be adjusted by geometry and firing sequence according to the time/phase displacement theory commonly employed in the design of electromagnetic and acoustic radiators. Elements so involved in pattern shaping need not be the shapes indicated in FIGURE 7. They may include any patterns not violating firing rules stated for this invention. For example, element 53 could be a round ball supported by two contact elements located at diametrically opposite points and fired simultaneously.

The embodiment of the invention shown in FIGURE 7 is particularly useful to underwater applications or the like, where the energy burst generating element must be subjected to high mechanical pressures. Similarly, the embodiment of FIGURE 7 is useful for other applications where the carbon element is susceptible to fractures due to mechanical shock wave components which increase with environmental density. For such environmental conditions, items 21A, 21B, 52 and 54 of FIGURE 7 may best be made of high melting point, shock resistant metals such as stainless steel, item 53 being constructed to the desired geometric configuration from carbon. This piece preferably will be made of carbon of maximum tensile strength and designed and mounted in accordance with commonly known principles for reduction of shock wave fractures in carbon.

The embodiment of FIGURE 7 offers an excellent opportunity for the application of tungsten carbide as elements 21A and 21B. Sufficiently tight contact with elements 52 and 54 permits looser contact with element 53 to create point source explosions. Element 53 may be made of a shock resistant carbon. A small carbon block has survived many underwater firings in this configuration. Alternately, element 53 may be made of any conducting material providing erosion of the material selected is not a problem. In such a case, the principal advantage gained by making elements 52 and 54 out of tungsten carbide is the lower erosion rate of that material.

Spring loading of the contacts 52 and 54 of FIGURE 7 offers the advantages of maintaining contact over wide degrees of material erosion and relieving the contact points of some stress by permitting elements 21A and 21B to bounce in reaction to firing shock. A long time constant on the spring return action permits elements 21A and 21B to oscillate acoustically nears its own period during the period of contact relief. In an undersea acoustic generator, this often is a desirable feature.

FIGURES 8a–8f illustrate an embodiment of the present invention in the form of a plasma gun for purposes of demonstrating both electromagnetic and hydro-acoustic influences on shaping and directing energy produced by this invention. Element 21 is the emitting element whose shape and size may be as described hereinabove in conjunction with FIGURES 4–7. Members 24 and 25 may be anodes such as those described in accordance with FIGURE 1. Electrical leads 55 and 56 supply current to the emitter element 21 from a supply source (not shown). The firing occurs within a combined insulating body frame and fluidic chamber means 57. Electrical leads 58 and 59 connect the two anodes 24 and 25 to external circuitry. Energy is emitted through a muzzle aperture 62 in the body frame 57. A magnet has poles 63 and 64 employed to apply magnetic flux perpendicular to the plane of plasma travel, which plane is common to members 21, 24 and 25.

According to principles commonly known in plasma technology, a plasma burst, created in a magnetic field perpendicular to the electrical current which generated the magnetic field, will be propelled (without discrimination between its negative and positive particles) according to Fleming's left-hand rule for electromotive force on conducting bodies. Thus, with the illustrated gun's electric and magnetic sources, a plasma burst from element 21 is propelled toward the muzzle 62. Acceleration of the plasma is further enhanced by the high magnitude current of proper polarity induced as the plasma contacts anodes 24 and 25. That is, there are two electric currents, one of which generates the plasma and causes its acceleration toward the muzzle aperture 62, and the other of which increases the acceleration of the plasma toward the muzzle aperture. Otherwise, describing the operation of the gun, the plasma generated by firing emitter 21 is influenced by the electric field between anodes 24 and 25. This produces a current flow in the plasma which, in the presence of the perpendicular magnetic field between poles 63 and 64, causes the plasma to be magnetically propelled toward the muzzle. During its lifetime in the chamber, the plasma also experiences hydroacoustic thermal pressures of its own, modified by chamber reflections, due to the fluid-filled outer chamber 65. Upon leaving the inner chamber 66, the energy pellet resembles a charge of atom sized carbon shot emerging from a shotgun at possibly supersonic velocity, and at a high temperature capable of cleaning an impact area of contaminants, heating it to fusing temperatures, and peening it with pressure.

In the embodiment of FIGURE 9, the energy burst generating element 21 and coextensively parallel portions 71 and 72 of electrical input leads 73 and 74 are maintained in the same plane (the Y, Z plane according to FIGURE 9). The emitter is illustrated as being along the Z axis. This results in a configuration in which the current in the input lead portions 71 and 72 forms a magnetic field which tends to propel the plasma in the X direction, perpendicular to the Y, Z plane.

In some cases, mechanical forces produced by the arrangement of FIGURE 9 create strains which tend to break the emitter element 21 before the plasma is born. This may be avoided by either of two techniques. As a first approach, element 21 may be firmly bonded to a strong non-conducting surface; typically, a thin film on a ceramic substrate has been employed. The parallel lead wire portions 71 and 72 also may be bonded to such a substrate. The second approach consists of shading the emitter element 21 from the fast rising magnetic field until the plasma is born. This has been accomplished by insertion of specific materials between the emitter 21 and the adjacent lead wire portions 71 and 72. For example, two sheets of copper may be placed parallel to the XZ plane between emitter 21 and lead wire portions 71 and 72, respectively. As a result of induced eddy currents, these copper sheets will introduce delays in the arrival of the magnetic pulse at the emitter element 21.

In all cases, breakage of the emitter element 21 by magnetic fields at the emitter has been found secondary to breakage by structural flexures and vibration as a reaction to firing forces. In FIGURE 9, a principal destructive force has been the tendency of the magnetic field to force apart the input lead portions 71 and 72 paralleling the emitter 21. To prevent this from occurring, firm structural support of these lead portions is essential.

Test results

A typical drawing pencil carbon approximately 2 centimeters in diameter and .5 inch in length between the metallic contacts has been employed as the energy burst generating element 21 for most tests. This element, which measured approximately .1 ohms (in the presence of only a few milliamperes of electrical current), reaches plasma threshold with a 250 volt charge on the capacitor 23. Neglecting stray circuit inductance and decrease of element resistance during approach to threshold, this implies a threshold current of 2500 amperes or a current density of approximately 12,500 amperes per square centimeter. Although total current requirements may be reduced for lower power energy sources by reducing element diameter, no means other than thin films has been proven for reducing current density requirements, regardless of the purity of carbon used. The drawing pencil carbon described is estimated to fall to .02 ohm or below at firing time with a 250 volt source. This implies a possible 3 peak megawatts into the element at threshold. With a 2500 volt capacitor charge, the element resistance is estimated to decrease to below .001 ohm at firing time; this implies a possible 300 megawatts peak input at firing time.

Plasma radiated by the energy burst generating element at either firing level (250 volts or 2500 volts) has been employed to switch still greater peak powers with switching gains exceeding 40 db. It is to be noted that a 250 volt (theoretical 2500 amp peak) input to element 21 has been employed to switch 2500 volts (at a theoretical 2.5 megamps peak) in the anode 24 to anode 25 circuit with an anode load resistance near zero.

One evidence of proof of plasma emission from the parent body has been obtained by the collection of thin films of carbon on cool bodies located at distances from the parent body exceeding two inches in normal atmosphere and exceeding 10 inches in vacuum.

There is considerable experimental evidence (see, for example, FIGURE 2) to support the viewpoint that for any particular homogenous quality of carbon present in the energy burst generating element, the firing threshold is directly related to current density. Also, the time required to bring an element to firing threshold is inversely proportional to the current density. For a given voltage across capacitor 23 this time relates directly to the cross-section of element 21. Thus, for an element 21 of tapered cross-section the delay of firing time of any increment of the length of the element after the application of current would be proportional to the cross-section at that particular increment. In addition, the available energy radiated by any increment of the element will be proportional to the value of current above threshold applied to the increment.

Since all cross-sections of an element 21 or all elements of a series circuit of elements are in series, the firing of any increment in a series circuit reduces resistance across that increment and increases current in the rest of the series of increments thus speeding up their achievement of firing point. These factors imply both the practicality of firing multiple elements in series and the practicality of firing tapered elements for the generation of energy having various time and geometric distributions. For series firing, capacitor 23 must be capable of exceeding the threshold of the element with the highest current threshold. Firing of energy burst generating elements in parallel is not to be recommended because the element which reaches threshold first usually drops low enough in resistance to prevent the other elements from firing.

The following experimental evidence is offered as further proof that the plasma generated by this invention results from processes wherein heating of the energy burst generating element decreases as the current density above threshold increases.

A film of ordinary machine oil lubricant was placed on a rod of graphite employed as emitter element 21. A 100 microfarad capacitor was employed to fire the emitter element; threshold was found to occur with the capacitor charged to 250 volts. A single firing at 2500 volts caused virtually no evaporation of the oil film. The rate of evaporation of the oil film per firing increased as firing voltage decreased. Just below threshold the oil film evaporated in clouds of smoke immediately following each firing. Evaporation of the oil film was tested by three methods during these studies, namely, appearance of surface of the element, visible smoke from the emitter, and collection of deposits on a cool collector surface, positioned near the emitter element. This invention has been fired in the presence of high ambient temperatures and various pressures from vacuum to two atmospheres with similar results. However, the relative intensity of the different forms of energy emitted by the parent emitter are altered according to large differences in environmental pressures, conductivity, temperature and the like. Particular care must be employed for underwater firings in order not to explode the emitter element. Such explosions are believed to be due both to water dielectric inertia preventing skin effects to be properly produced (thus forcing plasma to be created inside the emitter body) and to reflections of the acoustic shock wave upon collapse of the water bubble.

A number of test results have indicated various differences between tungsten carbide and carbon when used as the material for the energy burst generating element.

Numerous forms of carbon have been successfully fired. In general, it has been found that emission begins at points of higher resistance, such as the locations where the carbon contacts the holding collets, or points where the carbon element has been broken and is held together by physical force. The plasma shell thus initiated appears at higher firing levels to be approximately cylindrical, with the emitter element concentric with the axis of the cylinder.

When tungsten carbide rods are supported by collet pressures similar to those with which successful firing may be achieved, the tungsten carbide exhibits different firing characteristics. End flares occur on silicon carbide only with light end pressures from the collet contacts, while carbon fires with collet contact pressures varying over a wide range of light to heavy. Also, two rods of tungsten carbide held too tightly by the end collets to permit end flares, but tightly contacted under mechanical pressure where they meet between the collets, produce brilliant flares and energy bursts which resemble those of common carbon. However, regardless of power employed, the flares remain concentric to the contact point; under similar conditions with a carbon element, the flares become concentric with the carbon element itself. In addition, the tungsten carbide flares appear to contain meteoric particles, larger than ion size, similar to those produced by carbon with insufficient firing current.

There is no certain evidence that, in the presence of higher firing voltages, tungsten carbide would not produce flares of ion size particles concentric to the rod; therefore, such proof must be left to the availability of firing voltages higher than the 2500 volts available for the present experiments and tests.

An outstanding advantage of the two tungsten carbide rod structure described is the fact that it has given no trouble with blowout or fracture during underwater firing. It thus appears entirely adequate as an underwater acoustic generator. Actually, the point acoustic source will be preferable for many underwater acoustic purposes.

Operation of the energy burst generating element has been observed under varying firing conditions by performing a series of firings and stepping the charge voltage upward for each subsequent firing. These tests were carried out with the first firing voltage for below threshold and with subsequent firing voltages both near threshold and, later, far above threshold. Such tests indicate that at some charge voltage $V_s$ slightly lower than threshold, minor meteor-like erratic sparks emanate from the point contacts between the carbon element 21 and the clamping material. At a slightly higher firing potential, this emanation appears more like a luminescent gas or plasma. At a still higher potential, corresponding to threshold 35 (see FIGURE 2), the entire body of the element is enveloped in a more brilliant plasma, and an acoustic shock wave is generated.

Beyond certain limits of taper for FIGURE 6, full threshold appears to occur independently at each end of the carbon element 21. Also, if the taper of the element 21 shown in FIGURE 5 is excessive, the carbon will fuse or fracture (or both) at the center before threshold is achieved. In cases of extreme taper, such fusing occurs at charge voltages insufficient to create any emanation from the areas adjacent the end contacts.

Regardless of configuration, it has been found that when end-fire effects at voltages below threshold are successfully suppressed, the carbon is exploded internally at threshold. The remains do not have a fused or burned appearance, but consist of hard crystalline dendrites whose longer dimensions are in the direction of flow of firing current. Butts of carbon remaining in the end holders resemble an exploded cigar.

Among techniques which successfully suppress end-fire are daubing the contact area with thin layers of mud made either from carbon and water of mild acidity or from molten vinyl.

It has been noted that when the energy burst generating element is lightly encased in Teflon, it may be used and destroyed by a single firing. This indicates the occurrence of instantaneous temperatures exceeding the melting point of carbon. For the short burst destructive to carbon, the surface of the Teflon shows no sign of damage.

When large diameter tightly fitting thin Teflon washers are placed around the element 21 of FIGURE 4, for example, one each slightly toward the middle from collet contacts 41 and 42, an element which otherwise is not destroyed by currents above threshold without the washers is destroyed by the presence of such washers. Under these conditions, plasma is generated between each washer and the input contact nearest it, but at subnormal levels. The area of the element under each washer, and the area between it and the input contacts appears undamaged. The area between the two washers is both badly fused and blown apart with the cigar butt effect in the residue. When this test was performed in a vacuum, similar results occurred.

For reasons not yet understood, when two brass washers were substituted for the two Teflon washers, the plasma flare encompassed the entire element from end to end, including the area between the washers. There were no visible differences from normal firing due to the presence of the metal washers. However, there did appear to be a higher after-firing temperature on the portion of the emitter element lying between the washers.

In all cases, washers were tight fitted to reduce leakage. The addition of carbon mud to increase sealing appeared to make no difference. The mud was blown free of the brass washers but not of the Teflon.

A carbon rod mounted similarly to the configuration shown in FIGURE 4 has been broken at the middle with the break held closed by light pressure. The end contacts were then encaspulated in carbon mud to prevent end fire. Firing at above threshold level created no visible damage.

The carbon rod 21 of FIGURE 4 was replaced by a tungsten rod. The metal end contacts 41 and 42 were replaced by carbon so connected to the input current source that sparking at those points could not occur. Excellent firing results were obtained at both ends of the tungsten element but in no case did the tungsten element appear to be bridged by the flare. The tungsten suffered surface damage at the contact point with the carbon.

Theoretical considerations

A possible theory of operation of this invention is described hereinbelow.

The high frequency electrical current in any conductor is commonly known to behave in what is known as the skin effect, wherein most of the current travels close to the skin either inside or outside the conductor.

In the presence of abrupt changes from low to high magnitudes of electrical voltage, the fast current rise time creates a skin effect which in turn causes the near surface portions of the carbon element 21 to conduct more than its share of the current. Thus, at the threshold point, plasma is created principally at the surface of the carbon, where currents are believed to be most dense. This could be equated to a change of state in surface conditions, the plasma thus created immediately exhibiting a higher conductivity than the element 21 itself, thus effectively bypassing current from the rest of the element. This in turn further heats the plasma which diverts still more of the current. This continues ad infinitum until the plasma literally explodes into a super-excited flare.

When the available current drops to a level which no longer supports the plasma, the plasma dies of the forces of dissipation involved. If current greater than 25,000 amperes could be sustained long enough, the plasma would die of commonly known but not yet fully explained internal forces. These forces tend to hold the plasma together for a time duration which varies as the inverse of temperature, then cause it to blow apart.

Also according to this theory, the faster the rise-time of the firing current, the further from center of the element and the closer to the skin the effect will be, hence the less the quantity of plasma which will be blown loose. However, the resulting plasma would be active or hot in proportion to the rate at which it is blown loose. In addition, less plasma is blown loose to share the available current. Therefore, faster rise-time electrical currents should produce hotter plasma.

The theory described thus places destructive forces near the skin of the carbon leaving the inner body intact for reuse.

According to this theory, all particles leaving the body would be ionized. This is evidenced by the fine structure of the carbon particles deposited at rapid growth rates on a cool platelet placed near an energy burst generating element when fired. Conversely, the sputtering associated with a common exploding wire, deposits a variety of particle sizes on a collecting surface.

There is considerable evidence that above threshold the energy burst generating element does not increase in temperature with increased firing voltage but instead decreases in temperature inversely proportional to firing voltage. This implies "cooling" of the parent body by increased concentration of power in the plasma flare which is normally blown away from the body.

The test results tend to indicate that the primary initiation of the plasma is the point of highest contact resistance of the carbon elements, whether a carbon-to-carbon, or carbon-to-other-material contact. The plasma so generated bridges carbon but not other materials. This lends credence to a viewpoint that initial ionization assists in drawing other ionized particles from the parent element from which to bridge the remainder of that element.

The test observations also imply the possibility that ionized carbon emanating from higher resistance points at end contacts becomes trapped by magnetic fields created by current in the elements to become the skin to which the skin effect is attributable.

Under high environmental pressure, skins from any source would logically be more difficult to create, thus forcing more current into the carbon body where rapid expansion due to internal heating would create the cigar butt effect. This effect is also noticed under high water pressure except with careful parameter control.

The test results which show that firing in a vacuum is possible indicate that it is not air breakdown but carbon ions generated at the contacts which bridge the energy burst generating element during firing.

The destruction of the energy burst generating element after a single firing when encased in Teflon may be explained by noting that Teflon reduces the skin effect in the carbon. This causes high activity plasma to be created internally to the emitter, the energy of which (since it cannot escape) explodes the element.

The following premises provide background for the theories describing this invention, and include both generally accepted concepts as well as observations not generally known.

The plasma state for an atom is that state in which the atom has become so excited that the positively charged particles (usually described as ions) and the negatively charged particles (free electrons) exist in their independent charge state but remain so geographically adjacent that at a distance point they produce no net sense of DC charge. A plasma flare consists of a number of such particles at a superexcited level. A cloud of plasma may contain all ranges of excitation up to flare level. Particles within the flare which are not excited to a higher level create losses within the activity of those which are so excited.

A cloud of plasma is electrically conductive in proportion to its density and temperature, frequently exceeding its parent element in conductivity per unit volume. This appears to be particularly true of carbon.

A pair of electrodes immersed in a plasma cloud in which the opposite charges have not been separated find equal conduction in both directions between the electrodes, i.e., conduction is unpolarized.

A given number of particles exploded into a plasma flare may at the moment of birth, provide a resistance per unit volume which is several decades lower than the resistance of the group of particles prior to firing. For a short time after birth, the plasma may become bottled by the magnetic fields incident to the heavy electrical currents which fostered its birth. However, the hotter the plasma, the shorter is this period. Therefore, after a short period, the plasma begins to explode at a hypersonic velocity which varies in proportion to plasma temperature, rate of birth, and impeding external forces.

In the presence of cooler bodies and gases, mechanical forces react to create bubbles whose shell is represented by the expanding mechanical shockwave. High mechanical pressures exist ahead of this shock wave, lowered pressure behind it. For a short distance, the skin of the bubble is composed of high activity plasma which deteriorates and alters in accordance with fields and mechanical impediments encountered. The plasma also generates electromagnetic fields of wide spectra.

It is appropriate to consider plasma at any level as having both mechanical and electrical forces which are not separably definable or detectable because of close interrelations between these forces in the plasma. For example, a mass of plasma, already at incandescent level and gyrating with itself in turbulent fashion as it seeks relief from internal pressure by exploding, may be radiating nearly universal electromagnetic and acoustic spectra.

Mechanical energy involved in collisions of particles with nearby physical impediments including other particles becomes translated into heat in both plasma and impediment.

When the emitter element of the invention is fired in the presence of a magnetic field which is perpendicular to the direction of current flow through the emitter, it is found that the plasma appears to emit entirely from the side of the emitter toward the direction in which the emitter would move, if it were not physically restrained, in accordance with Fleming's left-hand rule for electromotive force. This is the case for a rod configuration of the energy burst generating element with current flow in the axial direction and plasma departure perpendicular to both the axial direction and the direction of the magnetic flux lines. The tendency for the plasma to form on the side of departure from the emitter is attributed to a Hall effect modifying the skin effects believed to describe operation of the energy burst generating element. There appears to be a tendency for plasma emitted from the element to be in sheet form, one axis of the sheet being in the direction of travel, the other axis being in the direction of current flow in the emitter, the plane of the sheet thus being perpendicular to the magnetic flux lines. Sheets thus observed appear to be rough, wrinkled and torn with principal tears and irregularity contours lying approximately parallel to the direction of current flow. Sheets are often torn into filaments lying principally along the current flow axis, perpendicular to the line of travel. At present, the sheets are accounted for as being the result of a sort of magnetic extrusion process with the hottest spot in the emitter being the place where plasma is born. The wrinkling and tearing of the sheets is accounted for as the result of mechanical and electrical turbulence built up in the birth chamber. Tearing is accounted for principally along lines parallel to current flow being due to greater plasma binding power along those lines. This is likely due to electrical forces in the direction of current flow.

An additional theoretical viewpoint may equate the energy burst generating element to a fast-heating open-air filament which radiates highly excited high-velocity ions and electrons for applications normal for such particles, such filament being protected from burnout by a momentary plasma bubble with which it encapsulates itself and which serves both to bypass currents around the filament and to momentarily remove by shock waves the environmental gases from contact with the filament.

Comparison with other devices

This invention often is mistaken at first glance as being a mere reinvention of the common carbon arc. This is not true.

The ordinary carbon arc consists of electrical plasma in series with the carbon electrodes under conditions which require careful mechanical starting procedure and do not permit rapid keying or pulsing of the energies thus generated. Steep wave fronts in all related energies may be generated by activating the carbon arc from high surge currents with the electrodes in contact. Thus, the electrical plasma produced by a carbon arc at the starting point may originate from phenomena identical to that employed in my invention. However, such phenomena appear to have heretofore been considered undesirable and to have been designed around by employing such techniques as current-limiting starting devices.

In addition, at all times in the carbon arc, the plasma is in series with the electrodes. During the starting period this plasma is dense and of lower resistance than the body of the electrodes. This implies that during this period there is a high ratio of electrical dissipation in the electrodes in relation to the dissipation in the arc; this in turn limits the current which can be applied to the arc and thus limits its plasma activity. After starting, the plasma in the carbon arc expands to become much less dense and hence to have a higher electrical resistance in proportion to temperature. Thus, in a properly adjusted arc, high temperatures may exist with relatively low losses in the electrodes.

In this invention, the plasma burst is generated in parallel rather than in series with the parent material. This offers the following advantages over the common carbon arc. The current drawn by the plasma does not flow through the body of the element, and instead of increasing the current through the element, birth of the flare decreases the current by shunting the parent body. The hotter the plasma for a particular particle density, the less the current through the element.

At the moment of current application to the electrodes in the common arc, the contact resistance between the electrodes is subject to many variables. These are manifested in extreme variations in energy during the starting period; these variables in turn would interfere considerably with efforts to generate short pulse energies by this method. On the other hand, the major starting variables are the prefiring temperature of the carbon and the contact resistance at the tightly clamped voltage supply contacts. These result in a much smaller unpredictable variable than the contact resistance in a common arc. When even more precise results are required, the parent element may be temperature regulated between firings and the contact resistance may be monitored by application of a low level steady state current. This also provides information for compensation of prefiring resistance where higher precision is desired by selection of appropriate firing potential. The invention may in fact be employed for rapid and simplified starting of a carbon arc. Refer to description of FIGURE 1 where elements 24–25 may represent a preadjusted gap in a carbon arc.

The inventive energy burst generating element also may be contrasted with spark gaps or spark plugs. Spark gaps immersed in conducting liquids and gases are often employed for producing electrical explosions or ignition. These include the ordinary automobile spark plug and undersea acoustic shock pulse generators.

For many undersea acoustic purposes, the discharge between two spaced electrodes across a gap closed by sea water is inferior in efficiency and shock wave steepness to the exploding wire. It is noted elsewhere that suitable automatic feeds for replacing exploding wires undersea have not yet been achieved.

Also in the spark gaps immersed in conducting liquids or gases, the gap electrodes tend to react chemically with the environmental gas or liquid to cause deposits whose surface conduction effects on the electrode are unpredictable. This invention has no spark gap to alter, and thus provides an effectively self-cleaning spark plug. In addition, deposits created by chemical reaction are only in electrical parallel with the parent element. They cannot achieve series connection. If such deposits are of higher conductivity than the parent element, the amount deposited as the result of a single firing normally is so small as to be exploded away by the current they receive during the next firing. If such deposits are insulators, they do not inhibit conduction by the parent element, they are in shunt, and they will be blown away rapidly by forces generated by subsequent firings.

It is true that gradual excretion of the substance of the material contributes to an increase in electrical resistance. This is particularly noted on thin films at high power where percentage loss of material per firing is higher than in more solid formations. However, degeneration of the element is predictable and may be accounted for in operation. A single .2 millimeter pencil lead mounted in one holder has survived for five years an untold number of tests in a number of types of non-explosive environments, excepting water and including vacuum. Special considerations are required for firing under dense and high dielectric environments such as water.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A device for repetitively generating a burst of energy, comprising:
   an elongated element comprising an electrically conductive and normally resistive material formed in a non-fibrous non-filamented rigid compacted mass having an exterior surface such that a central longitudinal plane through said element intersects a continuous line on said exterior surface;
   electrical contacts attached to said element in longitudinally spaced relationship whereby said contacts and said element form a first electrical path; and
   means for applying to said element via said contacts a voltage pulse of predetermined selected amplitude and duration for causing only skin-effect conduction along said first electrical path during the transient onset of said pulse and generating a plasma from said element constituting a second electrical path exteriorly of said element and in electrical parallel therewith between said contacts.

2. A device as defined by claim 1 wherein said element is a cylindrical rod.

3. A device as defined by claim 1 wherein said element comprises one of carbon or carbon containing material.

4. A device as defined by claim 1 wherein said element is tapered.

5. A plasma gun comprising in combination:
   a device as defined by claim 1;
   means for generating an electric field in a plane containing said element; and
   means for generating a magnetic field in a plane perpendicular to the plane of said electric field, and wherein said electric and magnetic fields direct and accelerate plasma particles generated by said device.

6. A device as defined by claim 4 wherein said element is tapered inwardly intermediate its opposite ends.

7. A device as defined by claim 4 wherein said element is tapered outwardly intermediate its opposite ends.

8. A bidirectional switch for switching very high voltages and currents, said switch comprising:
   a device as defined by claim 1; and
   means comprising at least two anodes disposed is closely spaced, non-contiguous relationship with said element, and wherein said anodes intersect said second electrical path.

References Cited

UNITED STATES PATENTS

| 2,745,934 | 5/1956 | Curtin et al. | 314—20 X |
| 2,754,757 | 7/1956 | MacLeod | 102—28 |
| 2,881,703 | 4/1959 | Volpert | 102—46 X |
| 2,924,140 | 2/1960 | Scherrer | 102—28 X |
| 3,002,457 | 10/1961 | Doughty | 102—28 X |
| 3,005,931 | 10/1961 | Dandl | 315—111 |
| 3,137,801 | 6/1964 | Brooks et al. | 313—231 X |
| 3,238,413 | 3/1966 | Thom et al. | 313—231 |
| 3,167,014 | 1/1965 | Kopito | 102—28 |

RODNEY D. BENNETT, Jr., Primary Examiner

BRIAN L. RIBANDO, Assistant Examiner

U.S. Cl. X.R.

102—28; 313—231; 315—111; 340—12